(12) United States Patent
Nicola et al.

(10) Patent No.: US 9,740,698 B2
(45) Date of Patent: *Aug. 22, 2017

(54) DOCUMENT MERGE BASED ON KNOWLEDGE OF DOCUMENT SCHEMA

(71) Applicant: International Business Machines Corporation, Armonk, NY (US)

(72) Inventors: Matthias Nicola, San Jose, CA (US); Martin Sommerlandt, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/940,646

(22) Filed: Jul. 12, 2013

(65) Prior Publication Data

US 2013/0304769 A1 Nov. 14, 2013

Related U.S. Application Data

(63) Continuation of application No. 13/359,607, filed on Jan. 27, 2012, now Pat. No. 9,626,368.

(51) Int. Cl.
G06F 17/30 (2006.01)
G06F 17/22 (2006.01)

(52) U.S. Cl.
CPC ...... *G06F 17/30076* (2013.01); *G06F 17/227* (2013.01); *G06F 17/2247* (2013.01); *G06F 17/3092* (2013.01)

(58) Field of Classification Search
CPC ......... G06F 17/30174; G06F 17/30911; G06F 8/65; G06F 17/30896; G06F 17/30923;
(Continued)

(56) References Cited

U.S. PATENT DOCUMENTS 6,848,078 B1 * 1/2005 Birsan et al. ............... 715/206
7,031,956 B1 * 4/2006 Lee .................... G06F 17/30595
(Continued)

FOREIGN PATENT DOCUMENTS

CN 101241532 A 8/2008
CN 101630350 A 1/2010
CN 102298677 A 12/2011

OTHER PUBLICATIONS

Tan et al., "Reasoning and Merging in XML Data Integration", 22nd International Conference on Advanced Information Networking and Applications, 2008, AINA 2008, 441-448.
(Continued)

*Primary Examiner* — Laurie Ries
*Assistant Examiner* — Brian Garmon
(74) *Attorney, Agent, or Firm* — Erik K. Johnson; Edell, Shapiro & Finnan, LLC

(57) ABSTRACT

According to one embodiment of the present invention, a system merges documents, and comprises a computer system including at least one processor. The system receives an update document including one or more updates for a target document arranged according to a document schema defined by schema information. Update information includes one or more paths to nodes within the document schema, and is examined to identify eligible paths for the updates. The updates from the update document associated with the eligible paths are applied to the target document in accordance with the schema information to produce an updated document in compliance with the document schema. Embodiments of the present invention further include a method and computer program product for merging documents in substantially the same manner described above.

8 Claims, 6 Drawing Sheets

(58) Field of Classification Search
CPC .............. G06F 17/65; G06F 17/30076; G06F 17/2247; G06F 17/227; G06F 17/3092
USPC ................................ 715/234, 255; 707/706
See application file for complete search history.

(56) References Cited

U.S. PATENT DOCUMENTS

| | | | |
|---|---|---|---|
| 7,703,005 | B2 | 4/2010 | Felts |
| 7,721,188 | B2 | 5/2010 | Abe et al. |
| 7,831,540 | B2 | 11/2010 | Medi et al. |
| 7,941,399 | B2 * | 5/2011 | Bailor .................... G06F 17/24 707/608 |
| 8,543,619 | B2 * | 9/2013 | Dharmalingam ............. 707/803 |
| 2003/0172168 | A1 * | 9/2003 | Mak et al. .................... 709/230 |
| 2004/0060006 | A1 | 3/2004 | Lindblad et al. ............. 715/513 |
| 2004/0103252 | A1 | 5/2004 | Lee et al. |
| 2005/0177578 | A1 * | 8/2005 | Chen .................. G06F 17/2247 |
| 2006/0053366 | A1 | 3/2006 | Abe |
| 2006/0168519 | A1 | 7/2006 | Torii et al. |
| 2007/0005657 | A1 | 1/2007 | Bohannon et al. |
| 2007/0043686 | A1 * | 2/2007 | Teng ................ G06F 17/30923 |
| 2007/0162486 | A1 | 7/2007 | Brueggemann et al. |
| 2007/0240034 | A1 | 10/2007 | Sthanikam et al. |
| 2007/0240035 | A1 | 10/2007 | Sthanikam et al. |
| 2007/0260650 | A1 | 11/2007 | Warner et al. |
| 2007/0294283 | A1 | 12/2007 | Mackay |
| 2008/0028003 | A1 | 1/2008 | Brueggemann |
| 2008/0235260 | A1 | 9/2008 | Han et al. |
| 2008/0275919 | A1 * | 11/2008 | Murthy ............. G06F 17/30911 |
| 2009/0112890 | A1 | 4/2009 | Medi et al. |
| 2010/0088676 | A1 * | 4/2010 | Yuan et al. ................... 717/120 |
| 2011/0066626 | A1 * | 3/2011 | Dharmalingam ............. 707/758 |
| 2013/0198605 | A1 | 8/2013 | Nicola et al. |

OTHER PUBLICATIONS

Madria et al., "An XML schema integration and query mechanism system" Data & Knowledge Engineering, vol. 65, No. 2, pp. 266-303, Sep. 21, 2007.
Bouchou et al., "Updates and Incremental Validation of XML Documents", The 9th International Workshop on Database Programming Languages (DBPL), No. 2921 in LNCS, 2003, 10 pages.
Abrao et al., "Incremental Constraint Checking for XML Documents", In Proceedings of the Second International XML Database Symposium, No. 3186 in Lecture Notes in Computer Science (LNCS), Spring-Verlag, 2004, 15 pages.
Pardede et al., "Preserving conceptual constraints during XML updates", International Journal of Web Information Systems, vol. 1, No. 2, pp. 65-82, 2005.
"XML Diff and Merge Tool", http://www.xml.com/pub/r/738, 1 page, Sep. 18, 2000.
Terwilliger, James F. et al., Full-Fidelity Flexible Object-Oriented XML Access, VLDB Aug. 2009, Lyon, France. VLDB Endowment, ACM 978-1-60558-948-0/09/08, pp. 1030-1041.
Wu, Yuqing et al., Using histograms to estimate answer sizes for XML queries. Information Systems 28, 2003, pp. 33-59.
Office Action, German Application 10 2013 200 355.2, Apr. 22, 2013, 6 pages.
Bouchou et al.: "Incremental Constraint Validation of XML Documents Under Multiple Updates" 2005, citeseerx.ist.psu.edu/showciting;jsessionid=21C71AE6D58057789B8B2B1DF85786B7?cid=637567, accessed Sep. 13, 2013, pp. 1-16.
"XML::Merge—flexibly merge XML documents", version 1.2.565EgGd of XML::Merge, Jun. 5, 2005, web.archive.org/web/20070110225913/http://search.cpan.org/~pip/XML-Merge-1.2.565EgGd/Merge.pm, accessed Sep. 13, 2013, 7 pages.

* cited by examiner

DOCUMENT MERGE BASED ON KNOWLEDGE OF DOCUMENT SCHEMA

The present application claims priority to U.S. Nonprovisional Application No. 13/359,607, filed 27 Jan. 2012 and entitled "Document Merge Based on Knowledge of Document Schema," the disclosure of which is incorporated herein by reference it is entirety.

BACKGROUND

1. Technical Field

Present invention embodiments relate to merging of documents, and more specifically, to updating information within a target Extended Markup Language (XML) document based on content of an update document (containing modified target document data) in a manner complying with the schema of the target XML document.

2. Discussion of the Related Art

XML schemas are frequently used to define a required format and structure for XML documents. Updates or modifications for the XML documents can be represented as update messages or documents. An update document can be utilized to modify a corresponding existing or target XML document, and may include new values for elements/attributes in the target document, and/or new elements, attributes, or document fragments to be inserted into the target document. In addition, the update document may flag elements, attributes, or document fragments for deletion from the target document.

When merging the update and target documents, which can include inserting elements from the update document into the target document, all modifications to the target document need to be applied in such a manner that the modified target document complies with a given XML schema to maintain data integrity. The determination of a corresponding insert location in the target document for the modifications is a non-trivial task and needs to maintain compliance with the XML schema.

BRIEF SUMMARY

According to one embodiment of the present invention, a system merges documents, and comprises a computer system including at least one processor. The system receives an update document including one or more updates for a target document arranged according to a document schema defined by schema information. Update information includes one or more paths to nodes within the document schema, and is examined to identify eligible paths for the updates. The updates from the update document associated with the eligible paths are applied to the target document in accordance with the schema information to produce an updated document in compliance with the document schema. Embodiments of the present invention further include a method and computer program product for merging documents in substantially the same manner described above.

DETAILED DESCRIPTION

Present invention embodiments pertain to merging of XML documents or, in other words, to updating a target document based on content of an update document. The merge may cause values in the target document to be updated, new elements to be inserted into the target document, and/or existing elements to be deleted from the target document. The merge operation of present invention embodiments is performed with knowledge of an XML schema. This enables, among other things, the order and nesting of elements in the updated target document to comply with the XML schema, and new elements to be inserted into the target document at their correct position as defined by the XML schema, thereby maintaining data integrity and avoiding costly revalidation of the target document after the merge operation. Further, the merge operation of present invention embodiments is fully automated (without requiring human interaction to complete the merge of documents), thereby reducing errors, enhancing efficiency, and enabling scaling to large numbers of concurrent merge operations.

Moreover, present invention embodiments may merge update documents in the form of delta messages into a target document. A delta message is a special type of update document that contains only the changes for the target document. The delta message typically exhibits the same structure as the target document, but does not contain the document portions that should remain unchanged. This enables update documents to be much smaller than a target document. Thus, update documents may be accommodated by present invention embodiments even if the update documents do not represent a complete new version of the target document.

In addition, the merge operation of present invention embodiments is customizable, and enables an administrator or other user to specify the portions of an update document eligible to modify the target document. Further, the merge operation employs a tabular representation of an XML schema to enhance efficiency. This tabular representation may be implemented with tables and indexes in a relational database, and enables direct access to arbitrary points in the schema (without XML parsing or traversal). Moreover, the merge operation enables the target document to be updated without XML parsing.

Accordingly, present invention embodiments provide merger of XML documents according to an XML schema to maintain validity of the updated documents, and the ability to merge small delta messages into larger target documents. Present invention embodiments may generate a single update statement that applies all required changes to the target document in one execution. In an embodiment, this update statement can be performed in a native XML database, thereby avoiding parsing of the target document. In addition, the merge operation is performed without requiring manual intervention from a user.

Figure 1:
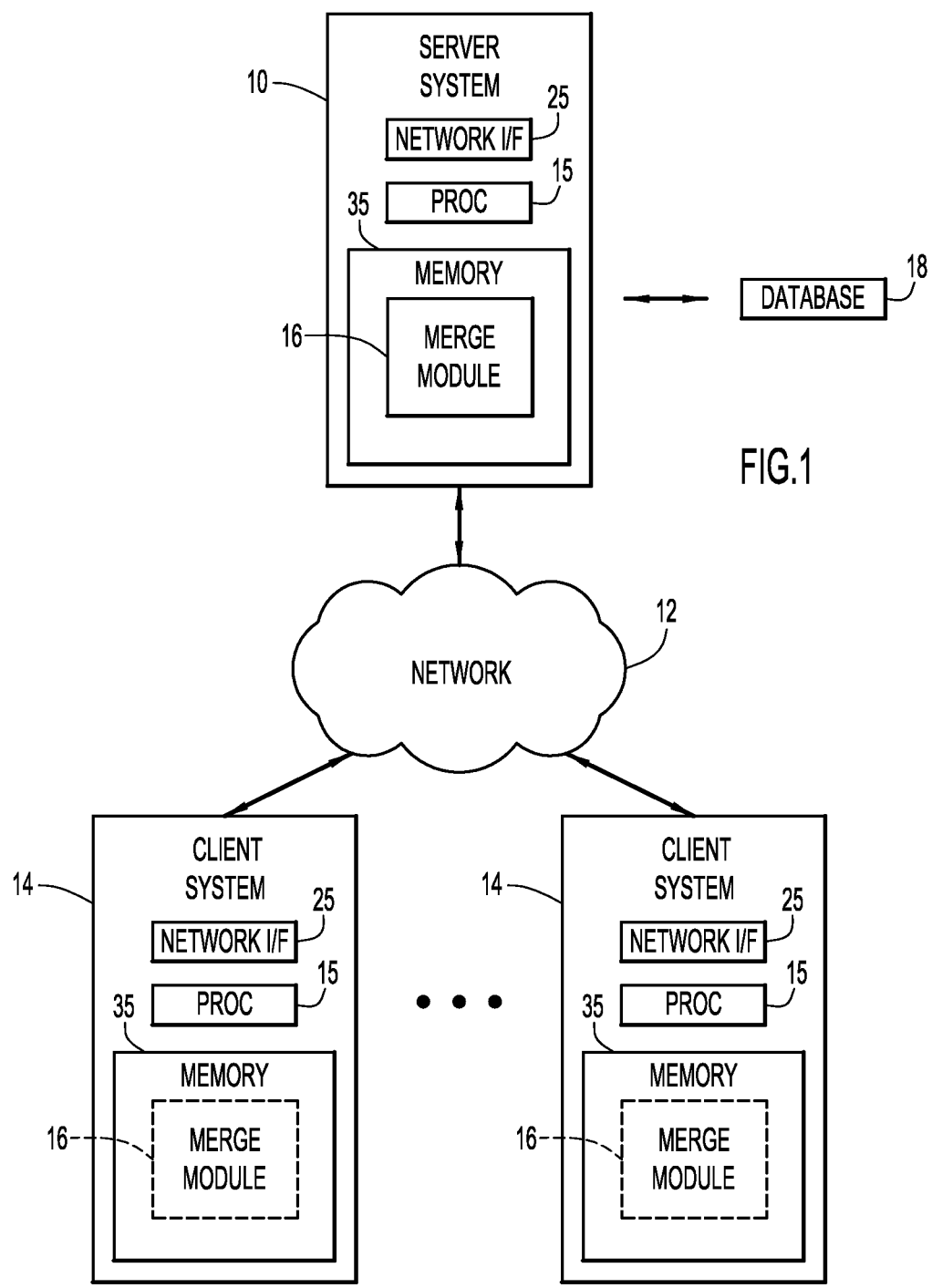
FIG. 1 is a diagrammatic illustration of an example computing environment for use with an embodiment of the present invention.

An example environment for use with present invention embodiments is illustrated in FIG. 1. Specifically, the environment includes one or more server systems 10 (e.g., database system server, middleware or application server, etc.), and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to submit documents (e.g., update and/or target documents) to server systems 10 for the document merge. The server systems include a merge module 16 to perform the merge operation. A database system 18 may store various information for the merge operation (e.g., schema table, update paths table, update and/or target documents, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired documents and analysis, and may provide reports including analysis results (e.g., update, target, and/or merged documents, failure of any updates, etc.).

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, merge module, browser/interface software, etc.).

Alternatively, one or more client systems 14 may merge documents when operating as a stand-alone unit. In a stand-alone mode of operation, the client system stores or has access to the data (e.g., schema table, update paths table, update documents, target document, etc.), and includes merge module 16 to perform the merge operation. The graphical user (e.g., GUI, etc.) or other interface (e.g., command line prompts, menu screens, etc.) solicits information from a corresponding user pertaining to the desired documents, and may provide reports including analysis results (e.g., update, target, and/or merged documents, failure of any updates, etc.).

Merge module 16 may include one or more modules or units to perform the various functions of present invention embodiments described below. The various modules (e.g., merge module, etc.) may be implemented by any combination of any quantity of software and/or hardware modules or units, and may reside within memory 35 of the server and/or client systems for execution by processor 15.

Figure 2:
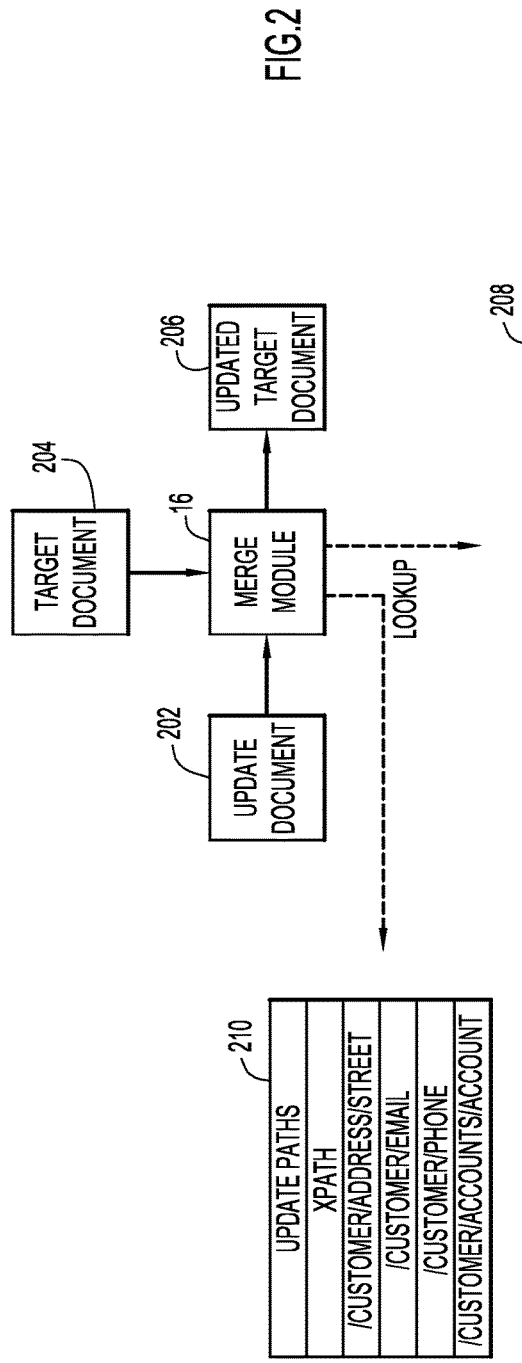
FIG. 2 is a diagrammatic illustration of processing information to merge an update document with a target document according to an embodiment of the present invention.

Referring to FIG. 2, a present invention embodiment employs an update document 202, a target document 204, and an XML schema represented by a schema table 208. The XML schema representation basically defines a tree type structure with nodes including one or more elements and/or attributes. The location of the nodes as defined by the schema may be indicated by a path. The path identifies the various nodes between a root element and a node of interest, thereby providing a path or route through the document structure to the node of interest. For each node, the schema table may also indicate the parent node, i.e. the preceding node in the path, thereby representing a tree structure effectively. A node may include an element occurring plural times. Multiple occurrences of an element may be distinguished by an identifier that can be defined to be some other node located at another path elsewhere in the tree structure. The path to the identifying node may be provided as a relative path, i.e. a path that starts from the node that needs distinction rather than a path that starts from the root of the tree structure. The relative path to an identifying node can simply point to an attribute, such as the type attribute of telephone number (e.g., cellular, work, etc.) as in the sample schema table 208, or to some other elements and/or their attributes.

An update paths table 210 is further employed by a present invention embodiment, and specifies a set of paths (within the XML schema) that are eligible for modification. In other words, the update paths table enables customization of the merge operation by identifying the paths (or nodes and corresponding data) that may be updated.

Merge module 16 (e.g., via server system 10 and/or client system 14) receives or has access to update document 202, target document 204, schema table 208, and update paths table 210, and intelligently probes these items to compare their structure and generate appropriate operations that modify target document 204 based on update document 202 in a manner compliant with the XML schema. A resultant updated target document 206 includes the modifications prescribed by update document 202.

The tabular representation of the XML schema within schema table 208 enables a particularly efficient implementation. However, the XML schema may be represented in any desired form or fashion, and within any suitable data or other structures (e.g., table, array, linked or other lists, queue, stack, etc.). The schema table includes the distinct names, paths, and relationships of nodes that may occur in an XML document generated according to a corresponding XML schema.

By way of example only, schema table 208 includes one row for each distinct node (and attribute) that can occur in an instance document. This representation is used as a look-up table to efficiently determine node locations (or paths), and relationships among the nodes in an XML document (e.g., parent, ancestor, sibling relationships, etc.). The schema table may be defined by the following example (SQL) construct:

```
CREATE TABLE schematable (
sequence_no          INT GENERATED ALWAYS AS IDENTITY,
node_name            VARCHAR(255) NOT NULL,
xpath                VARCHAR(4096) NOT NULL,
parent_xpath         VARCHAR(4096) NOT NULL,
repeating_elem       INTEGER,
relative_path_to_id  VARCHAR(1024) )
```

The sequence_no column indicates the depth-first order in which the nodes (or paths) are allowed to appear in an XML document (as defined by the XML schema). This is utilized for determining locations for sibling nodes within the XML schema as described below. By way of example, the sequence_no column may include an initial value (e.g., one, etc.)

for an initial node, and be generated by incrementing the current value (e.g., by one, etc.) for each successive node. The node_name and xpath columns include the name and the location path of each node within the XML schema, respectively. The column parent_xpath contains the path to the parent node of each node (and is empty for the root element). Sibling nodes and their relative order may be identified based on the parent_xpath field (e.g., and sequence number). The column repeating_elem is a flag to indicate elements of a corresponding node that can occur plural times within a document (e.g., a Boolean value of 0 indicates a non-repeating element, while a Boolean value of 1 indicates a repeating element). The column relative_path_to_id is an optional field, and contains a NULL value for those nodes (and paths) that occur at most once within a document. The field further contains a relative path to distinguish an element of a corresponding node that is allowed to occur more than once within a document. This relative path points to another element or attribute that may be used as a unique identifier among the repeating occurrences of the element to distinguish the repeating occurrences from each other (e.g., a type attribute may specify the type of a telephone number element (e.g., work, cellular, home, etc.) that may occur plural times for an associated telephone number node).

By way of example only, schema table 208 includes a Customer node that can have plural telephone elements (associated with a child telephone node) and plural account elements (associated with a child accounts node). The relative_path_to_id column indicates that telephone elements within a document may be distinguished based on their type attribute (e.g., @type as viewed in FIG. 2), and account elements within a document may be distinguished based on their account identification attribute (e.g., @accid as viewed in FIG. 2).

In addition, the schema table may contain additional columns or fields for further information (e.g., a flag to distinguish required from optional nodes (which is useful for processing node deletions), etc.). The merge operation of present invention embodiments may further accommodate documents with arbitrary namespaces. That is, the XML schema may define arbitrary namespaces that may occur in both the update and the target document. In that case, the schema table 208 and update paths table 210 can be enriched with appropriate namespace information, which is straightforward for someone skilled in the art. In an embodiment, an additional table may also be used to map namespace URIs (universal resources identifiers) to unique namespace prefixes.

The schema table may also contain other information for each node, such as a data type, an occurrence indicator, and other characteristics. However, the schema table is not required to contain information about data types or other facets that constrain node values, if it is known that the update document is valid with respect to the XML schema, or if the update document may be validated and rejected in response to containing disallowed values. In these cases, data type information etc. is not needed to ensure that the target document remains valid with the respect to the XML schema.

The schema table may be populated by generating a master document from the original XML schema. The master document includes an occurrence of each optional or mandatory element or attribute of the XML schema. If an element is allowed to occur more than once, the master document includes at least two occurrences of that element. Various conventional XML tools may be utilized to generate a master document from an XML schema. Once the master document is generated, a SQL/XML statement can be executed that traverses every path in the master document, extracts each distinct node name, path, and parent path, and detects whether an element occurs once or plural times within the master document. This information is inserted into the schema table. An administrator or other user with domain knowledge may provide entries for the relative_path_to_id column of those rows associated with a repeating element (e.g., where the repeating_elem column has the value of 1).

Alternatively, a software module (e.g., included within or independent of merge module 16) may be utilized (e.g., JAVA™, C, or other code, etc.) to read and parse the original XML schema, and generate the entries for the schema table.

Update paths table 210 includes the set of paths (or nodes within the XML schema) that are eligible to be updated. The update paths table may be much smaller than the schema table, and enables customization of the merge operation by controlling the data within a target document that may be updated. The update paths table may be fixed and indicate a subset of the paths within the XML schema eligible for an update (e.g., paths to nodes that may be updated). An example update paths table may be defined by the following example (SQL) construct:

CREATE TABLE update_paths (xpath VARCHAR(4096) NOT NULL)

By way of example only, update paths table 210 (FIG. 2) includes an xpath column specifying the paths from schema table 208 eligible for updates.

Alternatively, the update paths table may be created dynamically (e.g., as an in-memory structure) by deriving information from update documents. This is useful when the update documents are delta messages that contain very few paths. If the update paths table is created dynamically, it may also include columns with element and attribute values and various other information from the update document, such as relative identification ("rel_id") for (or manner of distinguishing) repeating elements. Such additional information in the updates paths table can be exploited for efficiency because it avoids or reduces subsequent navigation into the update document to extract values. A dynamically created update paths table may be defined by the following example (SQL) construct:

CREATE TABLE update_paths (xpath VARCHAR(4096) NOT NULL,
rel_id VARCHAR(1024),
value VARCHAR(1024)).

The rows in the update paths table are processed, where the paths indicated by the rows are used to probe intelligently into the update document, the target document, and the schema table. The merge operation may utilize the update paths table to determine various information. In particular, the merge operation determines which element or attribute values in the target document need to be replaced with values from the update document. If a repeating element is to be updated, the merge operation determines whether to update an existing occurrence of the element, or to insert an additional occurrence of the element.

The merge operation further determines whether new nodes (such as an occurrence of a repeating element) that do not yet occur in the target document need to be inserted into the target document. In this case, the merge operation determines the correct location for the new node within the target document that is critical to ensure the target document remains valid for the XML schema. An XQuery Update expression may be constructed and executed to update the target document appropriately. Alternatively, an XSLT style sheet or other XML update mechanisms can be generated and executed.

Figure 3:
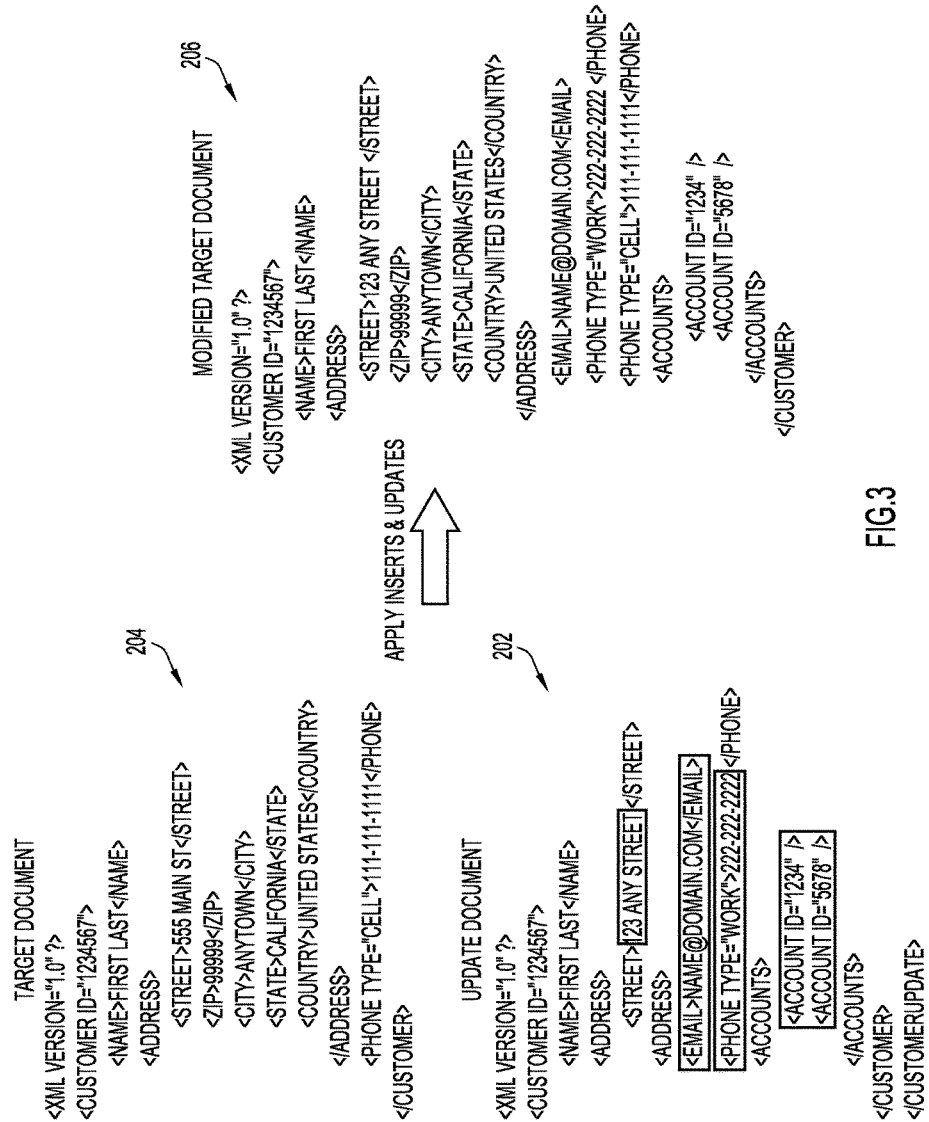
FIG. 3 is an example of updating a target XML document based on content within an update document in accordance with an XML schema of the target document according to an embodiment of the present invention.

An example merge of target document 202 with update document 204 is illustrated in FIG. 3. Specifically, target document 204 includes identification, name, address, and cellular telephone information for a customer. Update document 202 includes a structure similar to the structure of target document 204 with updated values for the street address and new data elements for electronic mail, work telephone, and account information. Merge module 16 (e.g., via server system 10 and/or client system 14) receives update document 202 and utilizes update paths table 210 to determine the information eligible to be updated. Schema table 208 is further utilized to identify the location within the target document structure for the information to be updated or inserted. Resulting modified target document 206 is produced. In this example, the address information within update document 202 has been updated within modified target document 206 at the appropriate location. In addition, since initial target document 204 does not include work telephone, electronic mail, and account information, these items have been added to modified target document 206 at appropriate locations within the target document structure based on the schema table. Accordingly, the modified target document 206 has been produced with updated information in compliance with the XML schema for the target document.

The updated information can be applied to the target document via generation and execution of an update expression or statement. The statement collectively applies the modifications (e.g., updates, insertion, etc.) to the target document, where insertions are provided at appropriate locations in accordance with the XML schema. The statement is produced by a concatenation of expressions for the individual modifications. An example XQuery update expression produced for the above modifications may be the following:

```
UPDATE table
SET xmldoc = XMLQUERY('
copy $TARGET := $XMLDOC
modify (
   do replace value of $TARGET/Customer/Address/Street
      with $UPDATE/Customer/Address/Street,
   do insert $UPDATE/Customer/Email
      after $TARGET/Customer/Address,
   do insert $UPDATE/Customer/Phone[@type = "work"]
      after $TARGET/Customer/Address,
   do insert $UPDATE/Customer/Accounts
      after $TARGET/Customer/Phone[last( )]
)
return $TARGET'
```

The expression may be implemented in any suitable query type language (e.g., XQuery, XSLT, etc.), and may further accommodate deletion of information within the target document as described below.

Figure 4A:
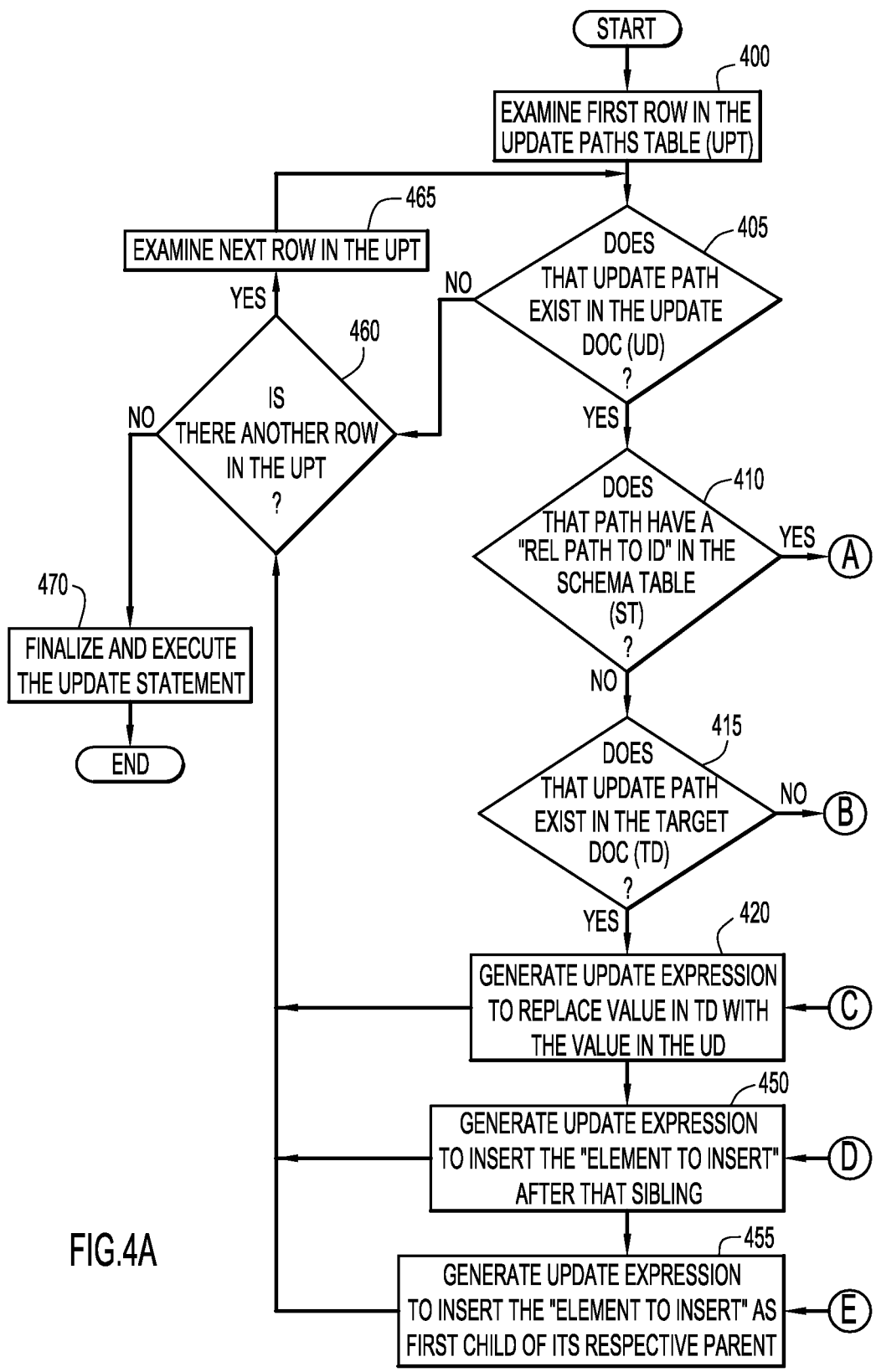
FIGS. 4A-4B are a procedural flow chart illustrating a manner of updating a target document with new or additional information according to an embodiment of the present invention.
Figure 4B:
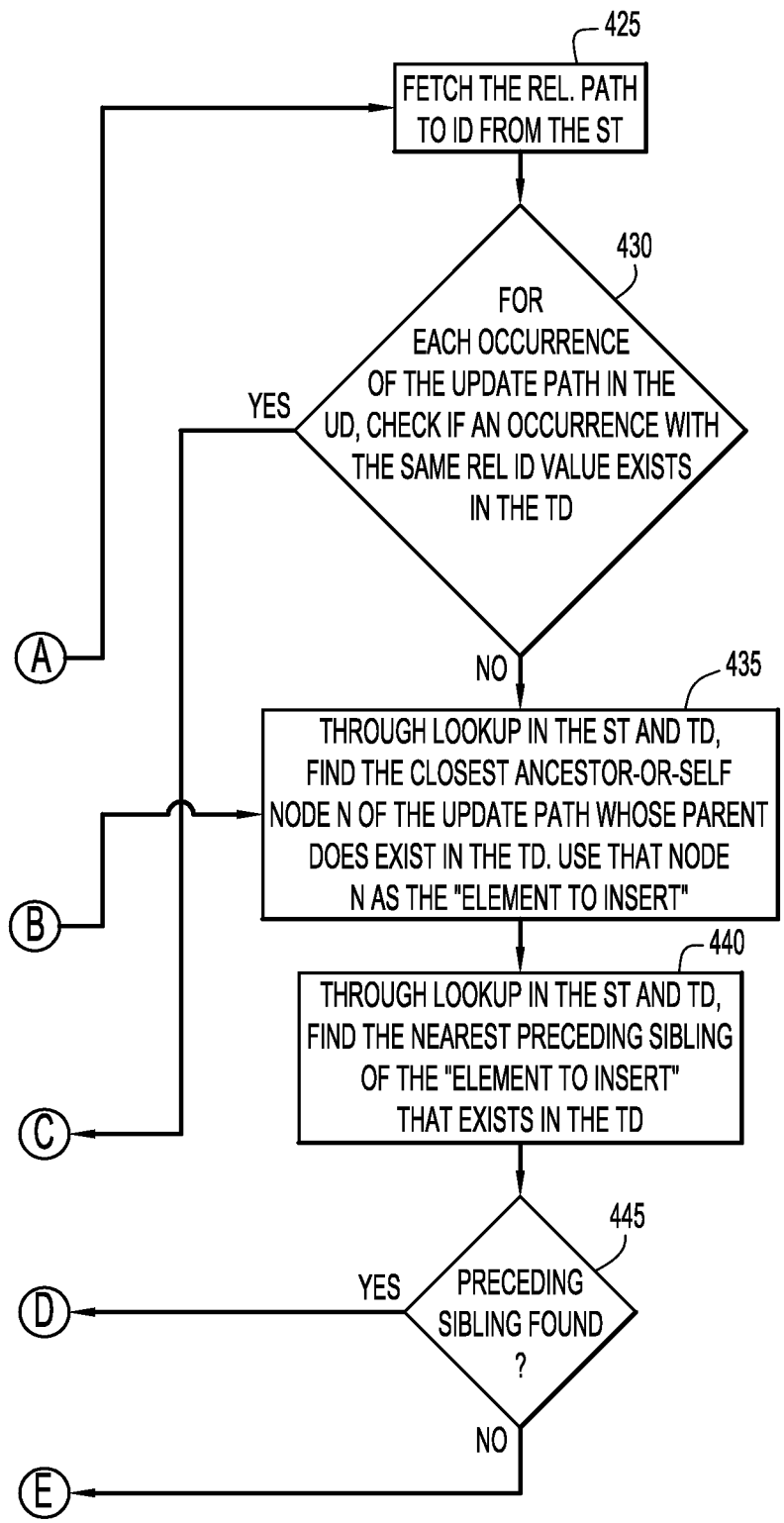

A manner to update a target document based on one or more update documents (e.g., via merge module 16 and server system 10 and/or client system 14) according to an embodiment of the present invention is illustrated in FIGS. 4A-4B. Initially, an XQuery update expression is generated to modify the target document based on the update paths table, schema table, and update document. Specifically, a row of the update paths table is retrieved and examined at step 400 to determine the presence of the update path within the update document. The modification of the target document is limited to the paths specified in the update paths table as being eligible for updating, thereby enabling customization of the merge operation. When the retrieved update path is absent from the update document as determined at step 405, the next row of the update paths table is retrieved at step 465 in response to the existence of another row in the update paths table as determined at step 460.

If the retrieved update path exists within the update document as determined at step 405 (e.g., the retrieved update path being determined as eligible for updates due to the presence in the update paths table), the merge module determines the presence of a value for the corresponding relative_path_to_id column for the retrieved update path (e.g., determines the presence of a repeating element) in schema table 208 at step 410. When the value is absent (e.g., indicating a single occurrence of the corresponding element of the retrieved update path (or node)), the merge module determines the presence of the retrieved update path in the target document at step 415. If the retrieved update path is present within the target document (e.g., which has been determined to be eligible for an update), an update expression is generated to replace the old value associated with the retrieved update path in the target document with the new value from the update document at step 420, and the next row from the update paths table is retrieved and examined at step 465 in response to the presence of another row in the update paths table as determined at step 460 in substantially the same manner described above.

When the retrieved update path does not exist in the target document as determined at step 415, the node corresponding to the retrieved update path does not exist in the target document and, therefore, needs to be inserted. Accordingly, a parent node for the retrieved update path (or node) within the document schema is determined in order to provide the location for insertion of the newly added node into the target document. If a parent node does not exist in the target document, the parent node similarly needs to be inserted (which requires a determination of the grand-parent node). The XML schema structure is traversed (e.g., via xpath and parent_xpath columns of schema table 208) to determine the nearest ancestor node with a parent node present within the target document. In the case where nodes between the ancestor node and the newly added node are absent from the target document, the appropriate lineage (hierarchy) of nodes from the ancestor node to the newly added node is inserted into the target document.

In particular, a parent node of the retrieved update path (or node) is retrieved from the schema table. If the parent node does not exist in the target document, the parent of the parent node (or grand-parent node) is retrieved from the schema table. This process is repeated until the ancestor node is identified, whose parent node exists in the target document at step 435. The identified ancestor node is the initial node of a lineage for insertion into the target document. Thus, the structure is basically traversed from the lowest or bottom tier to the upper or higher tiers in order to identify the ancestor node, where the entire missing lineage from the ancestor node to the newly added node (e.g., identified ancestor and corresponding descendant nodes) is inserted into the target document for compliance with the XML schema.

Once the node to be inserted or insert node is identified (i.e. either the update paths node, whose ancestor node exists in the target document, or the nearest ancestor node of the update path node, whose ancestor exists in the target document), the node to be inserted is placed at the appropriate location among sibling nodes in accordance with the XML schema. Accordingly, the nearest preceding sibling node of the identified insert node within the target document is determined at step 440. Specifically, the schema table is accessed to examine the preceding siblings of the identified insert node. Preceding sibling nodes are nodes whose sequence number in the schema table is lower than the sequence number of the insert node, and that have the same ancestor node, represented by the parent xpath column value in the schema table. The preceding sibling nodes are ordered by their sequence number (e.g., sequence_no column in schema table 208) in descending order, and the presence within the target document is determined for each sibling node in succession (in the order of the descending sequence numbers) until a preceding sibling node is identified. When a preceding sibling node is identified in the target document at step 445, an update expression is generated to insert the insert node after the identified preceding sibling node in the target document at step 450. The corresponding descendant nodes are inserted in the appropriate relation to the inserted node with the newly added node placed at the appropriate location within the lineage (e.g., the last descendant node in the hierarchy). The next row from the update paths table is retrieved and examined at step 465 in response to the presence of another row in the update paths table as determined at step 460 in substantially the same manner described above.

If no preceding sibling node is identified in the target document (e.g., the node to be inserted has no preceding siblings) as determined at step 445, an update expression is generated to insert the insert node as the first child of a corresponding parent node at step 455. The corresponding descendant nodes are inserted in the appropriate relation to the inserted node with the newly added node placed at the appropriate location within the lineage (e.g., the last descendant node in the hierarchy). The next row from the update paths table is retrieved and examined at step 465 in response to the presence of another row in the update paths table as determined at step 460 in substantially the same manner described above.

When a value for the relative_path_to_id column in schema table 208 is present as determined at step 410 (e.g., indicating a repeating element of the retrieved update path (or node)), the relative_path_to_id column value is retrieved from the schema table at step 425. For each occurrence of the corresponding repeating element in the update document, the presence of the same occurrence in the target document is determined at step 430. The similarity of occurrences is based on identical values for the element or attribute specified in the retrieved relative_path_to_id column. If the same occurrence is present within the target document, an update expression is generated to replace the value of the element occurrence (of the retrieved update path (or node)) in the target document with the new value from the update document at step 420. The next row from the update paths table is retrieved and examined at step 465 in response to the presence of another row in the update paths table as determined at step 460 in substantially the same manner described above.

If the same occurrence of a repeating element (of the retrieved update path (or node)) is not present within the target document as determined at step 430, the occurrence of the repeating element does not exist in the target document and, therefore, needs to be inserted. Accordingly, an appropriate location (or node) within the target document schema is determined for insertion of the newly added occurrence of the repeating element in substantially the same manner described above for a newly added node. The XML schema structure is traversed (e.g., via xpath and parent_xpath columns of schema table 208) until an appropriate node (e.g., the retrieved update path (or node) itself or a node within a higher tier of the schema) in the target document is identified for insertion of the new occurrence of the repeating element. In the case where nodes are absent between the identified node and the corresponding node for a new occurrence of the repeating element, the appropriate lineage of nodes is inserted into the target document in substantially the same manner described above for a newly added node.

In particular, the presence in the target document of the corresponding node for the repeating element (or retrieved update path (or node)) is initially determined for insertion of the new occurrence in the target document. If the corresponding node is present in the target document, an update expression is generated to insert the new occurrence of the repeating element for the corresponding node.

When the corresponding node (or retrieved update path (or node)) for the occurrence of the repeating element does not exist in the target document, a parent node of the retrieved update path (or node) is retrieved from the schema table. If the parent node does not exist in the target document, the parent of the parent node (or grand-parent node) is retrieved from the schema table. This process is repeated until the ancestor node is identified whose parent node exists in the target document at step 435 in substantially the same manner described above. The identified ancestor node is the initial node of a lineage for insertion into the target document. Thus, the structure is basically traversed from the lowest or bottom tier to the upper or higher tiers in order to identify the ancestor node, where the entire missing lineage from the ancestor node to the corresponding node for the new occurrence (e.g., identified ancestor and corresponding descendant nodes) is inserted into the target document for compliance with the XML schema.

Once the node to be inserted or insert node is identified, that node is placed in the target document at the appropriate location among sibling nodes in accordance with the XML schema in substantially the same manner as described above. The nearest preceding sibling node of the identified insert node within the target document is determined at step 440 as described above. The schema table is accessed to examine the preceding siblings of the identified insert node. The preceding sibling nodes are ordered by their sequence number (e.g., sequence_no column in schema table 208) in descending order, and the presence within the target document is determined for each sibling node in succession (in the order of the descending sequence numbers) until a preceding sibling node is identified.

When a preceding sibling node is identified in the target document at step 445, an update expression is generated to insert the insert node after the identified preceding sibling node in the target document at step 450 as described above. The corresponding descendant nodes are inserted in the appropriate relation to the insert node, and the new occurrence of the repeating element is inserted for the appropriate corresponding node within the lineage (e.g., the corresponding node is the last descendant node in the hierarchy). The next row from the update paths table is retrieved and examined at step 465 in response to the presence of another row in the update paths table as determined at step 460 in substantially the same manner described above.

If no preceding sibling node is identified in the target document (e.g., the insert node has no preceding siblings) as determined at step 445, an update expression is generated to insert the insert node as the first child into a corresponding parent node at step 455 as described above. The corresponding descendant nodes are inserted in the appropriate relation to the insert node, and the new occurrence of the repeating element is inserted for the appropriate corresponding node within the lineage (e.g., the corresponding node is the last descendant node in the hierarchy). The next row from the update paths table is retrieved and examined at step 465 in response to the presence of another row in the update paths table as determined at step 460 in substantially the same manner described above.

When each row from the update paths table has been processed as determined at step 460, the update expressions have been generated for the modification or merger. Accordingly, the update expressions are concatenated to form an XQuery transform expression that is executed at step 470 to apply the modifications to the target document.

Figure 5:
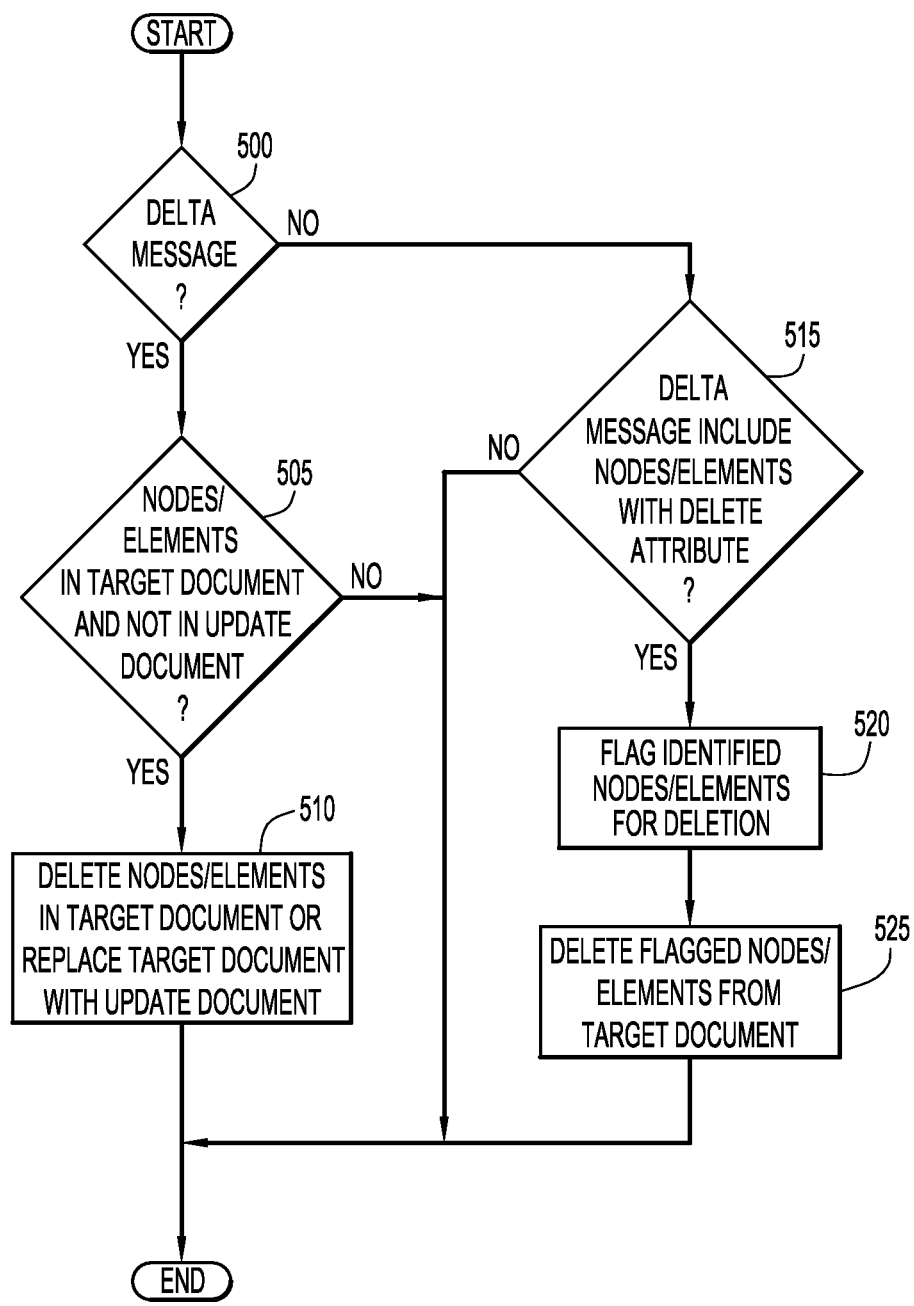
FIG. 5 is a procedural flow chart illustrating a manner of updating a target document with respect to removal of information according to an embodiment of the present invention.

A manner of deleting information from a target document based on content within an update document according to an embodiment of the present invention is illustrated in FIG. 5. Initially, an update document is provided including content pertaining to deletion of information within the target document. The update document may include a revised version of the target document with certain information removed. Alternatively, the update document may be in the form of a delta message including only the changed document portions. In this case, a delete attribute is utilized to indicate the corresponding node (and/or occurrence of a repeating element) in the target document for deletion.

When the provided update document is not a delta message as determined at step 500, the update document is examined to determine the presence of nodes (and/or occurrences of repeating elements) absent from the target document at step 505. In this case, the update document includes nodes (and/or occurrences of repeating elements) to be updated in the target document, and nodes (and/or occurrences of repeating elements) that are to remain unchanged. If a node exists in the target document but not in the update document, the node and corresponding descendant nodes (and the elements of the node and descendant nodes) are deleted from the target document at step 510. If an occurrence of a repeating element exists in the target document but not in the update document, the occurrence of the corresponding element is deleted from the target document at step 510. These operations may be accomplished by generation of an XQuery expression to perform the deletion in substantially the same manner described above. The XQuery expression may be formed by concatenation of individual expressions performing corresponding deletions, where the XQuery expression may be executed individually, or added to an XQuery expression including other modifications (e.g., updates, insertions, etc.). Thus, the modifications (e.g., update, insertion, deletion, etc.) for a target document may be collectively applied via execution of an XQuery expression for efficient modification of the target document (without XML parsing).

If the update document includes changed and unchanged nodes (and/or changed and unchanged occurrences of repeating elements) as described above, the update document basically represents a complete new version of the target document. In this case, the deletion may alternatively be accomplished by replacing the target document with the update document.

When an update document is a delta message (e.g., includes only the nodes and/or occurrences of repeating elements to be changed) as determined at step 500, the attributes of the nodes and/or occurrences of the repeating elements are examined to determine the presence of a delete indication at step 515. When a node and/or occurrence of a repeating element includes an attribute indicating deletion, the node and/or occurrence of the repeating element is flagged for deletion at step 520. The flagged nodes and/or occurrences of repeating elements are subsequently deleted from the target document at step 525. This may be accomplished by generation of an XQuery expression to perform the deletion in substantially the same manner described above. The XQuery expression may be formed by concatenation of individual expressions to perform corresponding deletions, where the XQuery expression may be executed individually, or added to an XQuery expression including other modifications (e.g., updates, insertions, etc.). Thus, the modifications (e.g., update, insertion, deletion, etc.) for a target document may be collectively applied via execution of an XQuery expression for efficient modification of the target document (without XML parsing).

It will be appreciated that the embodiments described above and illustrated in the drawings represent only a few of the many ways of implementing embodiments for a document merge based on knowledge of document schema.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, merge module, module to create the schema table, etc.). These systems may include any types of monitors and input devices (e.g., keyboard, mouse, voice recognition, etc.) to enter and/or view information.

It is to be understood that the software (e.g., merge module, module to create the schema table, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., merge module, module to create the schema table, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., update and target documents, schema table, update paths table, etc.). The database system may be implemented by any number of any conventional or other databases, data stores or storage structures (e.g., files, databases, data structures, data or other repositories, etc.) to store information (e.g., update and target documents, schema table, update paths table, etc.). The database system may be included within or coupled to the server and/or client systems. The database systems and/or storage structures may be remote from or local to the computer or other processing systems, and may store any desired data (e.g., update and target documents, schema table, update paths table, etc.). Further, the various tables (e.g., schema table, update paths table, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized to merge any quantity of any types of documents according to any desired schema. The target and update documents may be of any type of document or file, include any desired information, and include any desired format (e.g., XML, etc.). The update document may include (or be in the form of) any type of message or document for indicating updates. The delta messages may include any desired format or information for indicating updates or changed portions of a document. The updates in the update documents (including the delta messages) may be indicated in any desired fashion (e.g., changed document portions, a revised version of the document, etc.), and include any quantity of any desired attributes indicating characteristics or actions for the updates (e.g., insertion, deletion, update, etc.). The update documents and delta messages may include any quantity of changed or unchanged portions of the target document.

The schema may be of any type, and include any suitable structure for the documents. The schema may be represented in any suitable fashion for determining compliance of a document with the schema (e.g., tables, arrays, linked or other lists, trees, queues, etc.). The schema table may include any desired information (e.g., nodes, paths, attributes, parent/sibling nodes, sequence numbers or other identifiers, etc.) and be arranged in any format (e.g., any quantity of columns with any suitable headers, etc.) to indicate a schema.

The data eligible to be updated may be indicated in any suitable fashion (e.g., tables, arrays, linked or other lists, trees, queues, etc.). The update paths table may include any desired information (e.g., nodes, paths, attributes, data elements, etc.) and be arranged in any format (e.g., any quantity of columns with any suitable headers, etc.) to indicate data eligible for updating. An administrator or other user may enter and/or modify the information within the update paths table to control modification of a target document. Any quantity of schema and update paths tables may be utilized, where each of the schema and update paths tables may be associated any quantity of schemas and/or documents for modification. The various names or other identifiers for the tables, rows, and/or columns are examples, and any suitable names or other identifiers may be employed.

The modifications to the target document may be implemented in any desired fashion, either collectively, individually, or in any desired combination (in any desired quantity). The modifications may be applied via a query or other command in any suitable query or other language. The query or command may be generated to apply any quantity of the modifications to the target document. Alternatively, a target document may be replaced by an update document in the event the update document includes a modified version of the target document.

The present invention embodiments may employ any number of any type of user interface (e.g., Graphical User Interface (GUI), command-line, prompt, etc.) for obtaining or providing information (e.g., update and target documents, schema table, update paths table, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., update, target and/or resulting modified documents, failures of updates, etc.).

Any quantity of nodes absent from the target document may be inserted to provide a structure for the target document compliant with the document schema when information needs to be added to the target document. The schema may be traversed in any desired fashion (e.g., bottom tiers towards upper tiers, upper tiers toward bottom tiers, etc.) to identify corresponding structure portions absent from and for insertion within the target document. An ancestor node may be inserted as any suitable sibling for a parent node (e.g., in accordance with a specified order, at any location in the event of an unordered structure, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of merging documents comprising:
   receiving an update document and a target document, wherein the update document and target document are document instances of a common document schema;
   determining whether an item of information in the update document is associated with an eligible path of the document schema in a predefined update table;
   generating, responsive to affirming that the item of information is associated with the eligible path, a specification of an operation by which the item of information is merged into the target document in compliance with the document schema; and
   applying the specified operation to the target document to produce an updated document in compliance with the document schema.

2. The computer-implemented method of claim 1, wherein the specified operation is a selected one of insertion of a node, deletion of a node, and modification of a value.

3. The computer-implemented method of claim 1, wherein the update document includes only updated portions for the target document.

4. The computer-implemented method of claim 1, wherein the merging of documents is completed by the computer without user intervention.

5. The computer-implemented method of claim 1, wherein the target document includes an XML document, the update document includes an XML document, and the document schema includes an XML schema.

6. The computer-implemented method of claim 1, further comprising:
   determining whether each of a plurality of items of information in the update document is associated with a corresponding eligible path of the document schema in the update table;
   generating, for the items of information associated with the eligible path in the update table, respective specifications of operations by which the items of information are merged into the target document in compliance with the document schema; and
   applying the plurality of specified operations to the target document to produce an updated document in compliance with the document schema.

7. The computer-implemented method of claim 1, wherein the specification of an operation comprises a selected one of an XQuery expression and an XSLT expression.

8. The computer-implemented method of claim 1, wherein generating the specification of an operation comprises determining a position in a sequence of elements in the target document at which to insert an element of the update document based on the information about the document schema.

* * * * *